(12) United States Patent
Bakfan et al.

(10) Patent No.: US 10,055,679 B2
(45) Date of Patent: Aug. 21, 2018

(54) RFID TRANSPONDER AND METHODS FOR ASSOCIATING WITH A VEHICLE FUEL TANK

(71) Applicant: ORPAK SYSTEMS LTD, Bnei Brak (IL)

(72) Inventors: Shay Bakfan, Bnei Brak (IL); Itay Peri, Bnei Brak (IL); Saar Livneh, Bnei Brak (IL)

(73) Assignee: Orpak Systems Ltd., Bnei Brak (IL)

( * ) Notice: Subject to any disclaimer, the term of this patent is extended or adjusted under 35 U.S.C. 154(b) by 0 days.

(21) Appl. No.: 15/113,829

(22) PCT Filed: Jan. 23, 2015

(86) PCT No.: PCT/IL2015/050081
§ 371 (c)(1),
(2) Date: Jul. 24, 2016

(87) PCT Pub. No.: WO2015/111056
PCT Pub. Date: Jul. 30, 2015

(65) Prior Publication Data
US 2016/0342884 A1   Nov. 24, 2016

(30) Foreign Application Priority Data

Jan. 23, 2014 (IL) .......................... 230636

(51) Int. Cl.
G06K 19/06    (2006.01)
G06K 19/077   (2006.01)
B60K 15/03    (2006.01)

(52) U.S. Cl.
CPC ........ *G06K 19/07773* (2013.01); *B60K 15/03* (2013.01); *G06K 19/07749* (2013.01); *B60K 2015/03203* (2013.01); *B60K 2015/03434* (2013.01)

(58) Field of Classification Search
CPC ......... G06K 19/07749; G06K 19/0775; G06Q 30/0267; G06Q 50/163
USPC ............................. 235/492, 462.46, 472.02
See application file for complete search history.

(56) References Cited

U.S. PATENT DOCUMENTS

| | | | |
|---|---|---|---|
| 6,024,142 A * | 2/2000 | Bates | B67D 7/145 141/351 |
| 6,497,363 B1 | 12/2002 | Kelrich | |
| 6,900,719 B2 | 5/2005 | Roseman | |
| 7,042,357 B2 * | 5/2006 | Girvin | G06K 19/0739 340/568.2 |

(Continued)

OTHER PUBLICATIONS

International Search Report and Written Opinion for international application PCT/IL2015/050081, dated May 21, 2015.

(Continued)

*Primary Examiner* — Daniel St Cyr
(74) *Attorney, Agent, or Firm* — The Law Office of Joseph L. Felber (57) ABSTRACT

The present invention relates to electronic identification systems and more particularly but not limited to electronic identification systems to be used with vehicle-refueling systems, the identification system comprises a radio-frequency-identification (RFID) transponder (RFIDT) that may be easily associated with a vehicle at its vehicle fuel-tank-intake-pipe, the transponder having a ferrite-antenna.

19 Claims, 3 Drawing Sheets

(56) References Cited

U.S. PATENT DOCUMENTS

| | | |
|---|---|---|
| 7,301,462 B1 | 11/2007 | Holling et al. |
| 7,907,058 B2 | 3/2011 | Weitzhandler et al. |
| 8,292,168 B2 | 10/2012 | Vilnai et al. |
| 2009/0289113 A1* | 11/2009 | Vilnai .................... B67D 7/34 235/381 |

OTHER PUBLICATIONS

International Preliminary Report on Patentability for international application PCT/IL2015/050081, completed Jun. 16, 2016.

* cited by examiner

RFID TRANSPONDER AND METHODS FOR ASSOCIATING WITH A VEHICLE FUEL TANK

FIELD OF THE INVENTION

The present invention relates to electronic identification systems and more particularly but not limited to electronic identification systems to be used with vehicle-refueling systems.

BACKGROUND

Vehicle-refueling systems, in which a vehicle is provided with a way of identifying itself to a fuel provider, are known from many years and were published in a plurality of patents and patent applications. For example U.S. Pat. No. 6,497,363; U.S. Pat. No. 6,900,719; and others describe examples of such systems. In those systems an inductive ring is placed around the upper end of the fuel intake pipe of a vehicle. The ring is connected to a radio-frequency-identification (RFID) transponder assembly. The RFID assembly is configured to transmit information regarding the vehicle, owner, charge account number, type of fuel required and the like. The ID information is transmitted via the inductive ring to a receiver, which may be placed on the nozzle of the refueling pipe, and thus relayed to the fuel provider. The inductive ring may comprise a conductive coil that is places around the fuel intake pipe of a vehicle.

The inductive ring is used as an RF antenna for transmitting the ID information. In addition the ring is also used for obtaining RF energy from the refueling pipe. The RF energy is converted to direct-current (DC) and be used as the energy source of the RFID assembly. Other refueling systems may use a button type RFID without using an inductive ring, however those system have a power supply from the vehicle or from a battery.

Such vehicle-refueling systems are popular with organizations that run large fleets of vehicles and they allow vehicle refueling to be carried out without fuss and charged to a central account and for data concerning refueling operations to be collected. Furthermore, those systems can prevent fraud to reduce fuel expenses.

In order to protect the RFID from theft, and to prevent other forms of foul play it is common that the RFID assembly is mounted to the vehicle in a complicated way. Typically, it requires drilling a hole in the vehicle wall near the fuel tank. In some existing vehicle-refueling systems the RFID assembly is installed on the other side of the vehicle wall while a cable passes via a hole connects the RFID assembly with the inductive ring. In other existing systems the RFID assembly is embedded within a unique and complex sleeve that is inserted into the hole and be attached to the vehicle in an irreversible way such that it cannot be pulled out or be broken will it is pulled out.

SUMMARY

Despite the prior art refueling system more and more new vehicles have different type, design and shapes of fuel-tank-intake-pipe chamber (FTIPC), different type of materials are used for constructing the vehicle wall around the fuel tank opening. In some vehicles the wall near the fuel tank is made of plastic. Some of the new vehicles may have a very short fuel intake pipe. Instead, in those vehicles the fuel-tank cover of the tank intake pipe chamber is adapted to block the opening of the intake fuel tank pipe, the like or any combination thereof. We found that mounting the RFID assembly with its associated inductive ring around the fuel-intake pipe become more and more complicated, requires a skilled technician and needs to be adapted to the vehicle type. Further, we found that there are many car owners that are not willing to drill into their vehicle and therefore refuse to use the vehicle-refueling system.

The above described deficiencies and limitations of the currently used RFID assembly and its associated inductive ring do not intend to limit the scope of the inventive concepts of the present disclosure in any manner. The deficiencies are presented for illustration only. The disclosure is directed to a novel technique for assembling the RFID with an RF antenna into a single device that is easily attached to the vehicle wall near the fuel intake pipe without any drilling and without external power supply. In some example embodiments, attaching the single device to the car wall can be done by gluing the device to the car wall near the intake pipe of the fuel tank.

An example of such a novel RFID transponder (NRT), among other elements, may comprise an RF antenna and an RFID electronic circuit that are combined together into one device. The NRT may be mounted and/or associated on the car wall near the intake-pipe of the car-fuel tank without drilling.

In some embodiments, the NRT may be constructed from two portions and/or segments that are joined and/or associated with one another. A first portion may comprise a ferrite antenna and a second portion may comprise the RFID-electronic circuit board. The ferrite antenna may be used for receiving the RF energy transmitted from a refueling-pipe-RF assembly (RPRFA), which is mounted on the nozzle of the refueling-pipe. Optionally the ferrite antenna may be used for transmitting the ID information of the vehicle, which is generated by the RFID electronic-circuit and is transferred via the ferrite antenna of the NRT toward an antenna located at the refueling pipe as part of the RPRFA.

An example of the RFID electronic circuit may have two facets, an external facet that may be attached to the car wall and an internal facet that faces the ferrite antenna. The ferrite antenna portion may have two facets, an internal facet and an external facet. Preferably, the internal facet of the ferrite antenna section faces the internal facet of the RFID-electronic circuit board section. While the external facet of the ferrite antenna section may face the opening of the intake pipe of the fuel tank. The two portions may be sealed together to form the NRT. Optionally, mounting the NRT to the vehicle wall near the intake pipe of the vehicle-fuel tank may be done by attaching the external side of the RFID-electronic circuit board to the vehicle wall while the section of the ferrite antenna faces toward the opening of the intake pipe of the fuel tank.

Some embodiments of NRT may comprise a tamperproof and/or destroying mechanism that renders the NRT non functions and/or destroys the NRT when it is detached from a vehicle wall. In some embodiments of the NRT the electronic-circuit section may be constructed in such a way that when the NRT is detached from the car wall, the RFIF-electronic circuit is broken wherein a part of the circuitry is removed from the car wall together with the ferrite antenna section while a part of it remains attached to the vehicle wall.

Optionally the NRT may be protected from chemical interaction with the fuel by using components such as but not limited to Epoxy Resin RX700K/BK and HX700K/NC manufactured by Robnor Resines Ltd UK to shield the NRT. Further the glue that may be used to attach the NRT to the vehicle wall may be adapted to overcome the environmental conditions near the intake pipe of the fuel tank. Following is a non-limiting example of glue that may be used for attaching the NRT to the car wall, for example including but not limited to at least one or more of: ST3294 manufactured by Holdtite Ltd. or QuikAluminum, QuikPlastik (depending on the material to which the NRT is attached) manufactured by Polymeric Systems, Inc (PSI), USA, the like or any combination thereof.

In order to adapt the NRT to currently installed base of vehicle-refueling systems in a huge number of fuel stations, the NRT has to be configured to operate in the same frequency band that is used in the installed systems. Therefore the ferrite antenna of the NRT needs to match the RF bandwidth that is used by the current installing-refueling systems. Some embodiments of the NRT that are adapted to operate with installed base of systems that use low frequency, below 500 KHz for example, need to have a large size ferrite. In some embodiments the dimensions of the ferrite may be in the range of few millimeters to few tens of millimeters, 8-40 millimeters, for example.

In some embodiments of the NRT may further comprise a location indicator. The location indicator may be used while installing the NRT. The indicator may be used for finding an optimal location in which the energy transmitting between the NRT and a transmitter/receiver (TxRx) is sufficient for proper operation of the NRT. In some embodiments, the location indicator may reflect the amount of energy that is received from the transmitter/receiver of the RPRFA that is mounted on the nozzle of the refueling pipe. The location indicator may be connected to or otherwise associated with the NRT during the installation and thereafter may be disconnected after the installation is complete. In other embodiment the installation indicator may be a part of the NRT and may be installed within one of the facets of the NRT. An embodiment of installation indicator may comprise a low power light emitting diode (LED), for example. Optionally, the indicator may be provided in the form of a voltmeter, an ampere meter or power meter that may be associated with and/or connected to pins located at one of the facets of the NRT. Optionally, the pins maybe connected to an RF-to-direct-current (DC) converter that obtains the RF energy transmitted from the RPRFA while moving the NRT around the fuel-refueling pipe while it is placed in the opening of the fuel tank. RF-to-direct-current converter may be a rectifier that converts the RF signal into DC, for example.

Optional embodiment of the novel technique and/or method may use the vehicle-refueling system at the fuel station in order to place the NRT at an appropriate location. Optionally, the vehicle-refueling system may be configured to indicate when coupling between the NRT and the inductive ring at the nozzle of the fuel pipe is sufficient for proper operation.

In other embodiments a vehicle-refueling simulator may be utilized to facilitate installing of the NRT according to optional embodiments of the present invention. An example vehicle-refueling simulator may include a refueling pipe similar to a common refueling pipe that comprises a handle with an inductive ring and a nozzle. The vehicle-refueling simulator may be configured to transmit RF signal via the simulator conductive ring. The simulator's RF signal is transmitted in similar frequency band and similar energy as the real RF signal that is transmitted via a real inductive ring. In addition the simulator can be configured to indicate when the coupling between the NRT and the inductive ring at the nozzle of the simulator's fuel pipe is sufficient for proper operation.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present invention will be understood and appreciated more fully from the following detailed description, taken in conjunction with the drawings in which.

DETAILED DESCRIPTION OF EXEMPLARY EMBODIMENT

Turning now to the figures in which like numerals represent like elements throughout the several views, exemplary embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Further, the figures were drawn out of scale. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a standalone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, the like or any combination thereof. In order to execute a certain task a software program may be loaded to an appropriate processor as needed. In the present disclosure the terms task, method, process can be used interchangeably.

Figure 1:
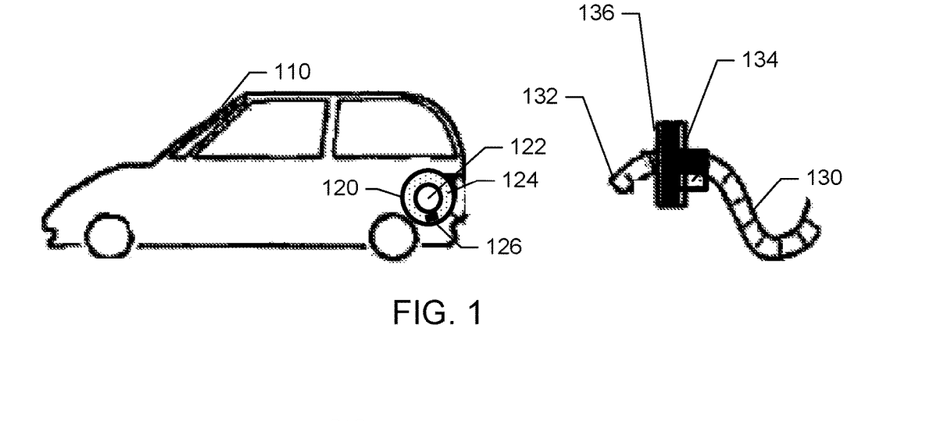
FIG. 1 is a block diagram illustrating a vehicle fuel-tank-intake-pipe chamber in which an example embodiment of an NRT may be installed.

FIG. 1 a block diagram illustrating relevant elements of a vehicle 110 and a refueling pipe 130. The vehicle 110 may comprise a fuel-tank-intake-pipe chamber (FTIPC) 120, a fuel-tank-intake pipe illustrates by opening 122. In some vehicles the FTIPC 120 may have wall 124 surrounding the fuel-tank-intake pipe. In such a vehicle an example embodiment of a NRT 126 may be attached to the wall 124. Some vehicles (not shown in the drawings), trucks for example, do not have a FTIPC 120 where the vehicle fuel-tank-intake pipe sticks out directly from the fuel tank. In such vehicles the NRT 126 may be attached to the vehicle fuel-tank-intake pipe.

The refueling pipe 130 may comprise a handle 134 associated with an inductive ring 136 and a nozzle 132. The nozzle 132 is configured to penetrate the opening 122 of the fuel-tank-intake pipe for refueling.

Upon insertion of the nozzle 132 into the fuel-tank opening 122 of the vehicle 110 an inductive coupling may be created between the inductive ring 136 and an internal-ferrite antenna of the installed NRT 126. An example of inductive ring 136 may transmit RF energy in frequency bands according to common RFID bands, for example including but not limited to optional range selected from the group of 120-150 KHz; 13.56 MHz; or the like. Preferably upon obtaining the RF energy, the installed NRT 126 is energized and responds by transmitting the ID number of the vehicle toward the inductive ring 136. The inductive ring 136 receives the ID information and transfers the vehicle ID information toward a refueling system installed in the fueling station. The refueling system is not shown in the drawings. As it was written above, refueling systems are well known in the art and will not be further described.

Figure 2:
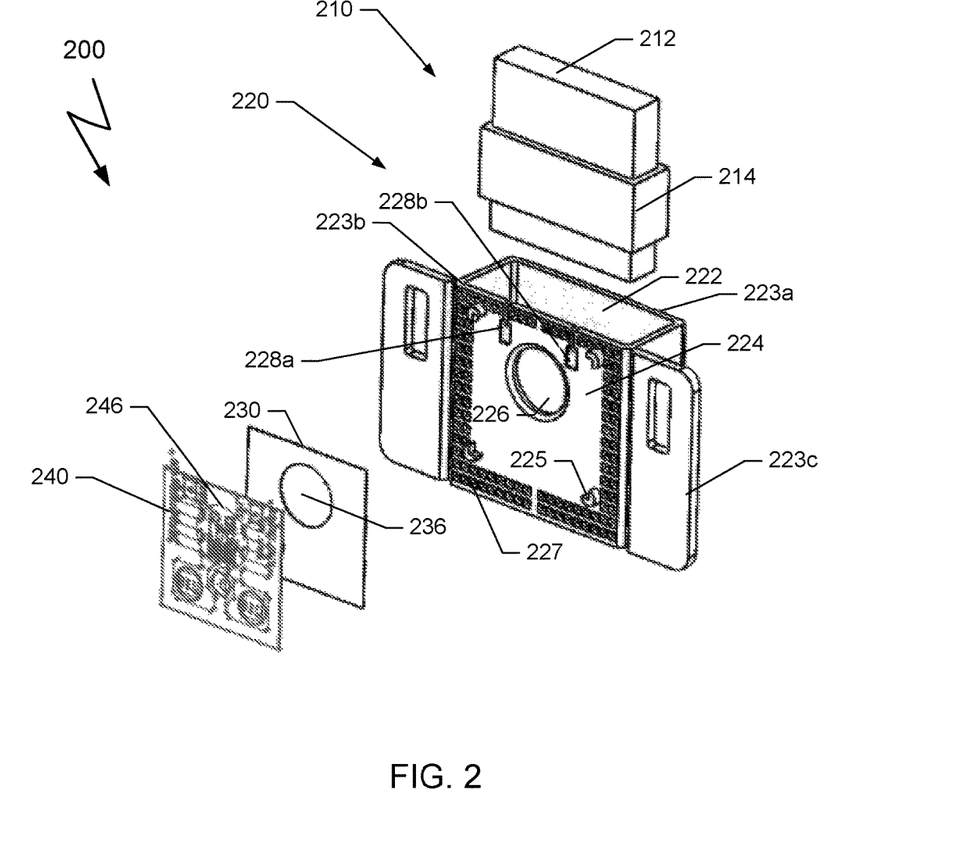
FIG. 2 illustrates an assembling diagram with relevant elements of an example embodiment of a NRT.

FIG. 2 illustrates an assembly diagram with relevant elements of an example embodiment of a NRT 200. NRT 200 may comprise a ferrite antenna 210, a cell 220, a double-sticky tape 230 and a RFID-electronic circuit board (ECB) 240. The ferrite antenna 210 may comprise a ferrite 212 and a coil 214. Some embodiments of the NRT 200 the ferrite antenna 210 may be configured to work in frequency bands according to common RFID bands, for example including but not limited to 120-150 KHz; 13.56 MHz; or the like. Optionally the size and/or individual dimensions (length, width, height) of the ferrite 212 may be adapted according to and/or in relation to the frequency band that is used. Optionally and preferably the higher the frequency the smaller the ferrite 212. Optionally the length of the ferrite 212 utilized may be determined in relation to the RF frequency band. For example, ferrite 212 may be provided with a length that is in the range of few tens of millimeters, respectively to the frequency band, 30 to 10 millimeters for example. Optionally the width of ferrite 212 may be configured according to the RF frequency band. For example, the width of the ferrite 212 may be few tens of mm (millimeters) to few millimeters, 25 to 8 mm. Optionally the height of ferrite 212 may be configured according to the RF frequency band. The height of the ferrite 212 may be few millimeters, 6 mm to 2 mm for example.

An example embodiment of NRT 200 may use a ferrite such as but not limited to ACME P41 (Mn—Zn) manufactured by Acme Electronics Corporation. Optionally the coil 214 may comprise winding in the order of a few hundreds. Optionally the number of windings may be determined according to the RF frequency band that is used. Optionally, coil 214 may comprise about 200 windings. Optionally coil 214 may comprising about 229 windings to about 218 windings according to the frequency band that is used. The wires (not shown in the drawings) in the two ends of the coil 214 may be preferably associated with and/or coupled and/or connected to the SCB 240.

Optionally of cell 220 may be made of plastic casting such as Polyamide (PA-6) manufactured by BASF Corp. USA. The dimensions of cell 220 may be adapted to the size of the ferrite antenna 210. An example of cell 220 may comprise a compartment 220, into which the ferrite antenna 210 may be inserted. In addition the compartment 220 may be designed to include at least one critical electronic component that is a part of and/or belongs to the ECB 240. Optionally the critical electronic component may penetrate into the compartment 222 via an opening 226, for example.

Optionally compartment 222 may have an external facet 223a and an internal facet 223b. The internal facet 223b is optionally and preferably configured to be attached to the ECB 240 as well as to a vehicle.

In some embodiments of NRT 200 the internal facet 223b may comprise a recess 224 that fits the size of the ECB 240 and the double-sticky tape 230. In some embodiments the recess 224 may have four pins 225 for positioning the ECB 240. The recess 224 may comprise one or more opening 226 that fit the location of certain critical electronic components of the ECB 240. Opening 226 may comprise optional components for example including but not limited to a Contact-less identification devices, EM4450 manufactured by EM Microelectronic-Marin SA; HTS-DS manufactured by Philips, for example. Preferably when the ECB 240 is engaged with the cell 220 the critical one or more components may penetrate into the space of the compartment 222. In some embodiments the opening 226 may be adapted to allow all the components of the ECB 240 to penetrate toward the space of compartment 222. In some examples of the NRT 200 recess 224 may include one or two holes 228a&b for inserting the two wires (not shown) from coil 214 and enabling the electronic connection between the ECB 240 and the ferrite antenna 210.

In some embodiment of the NRT 200 the external facet 223b may comprise one or more wings 223c, with or without holes, the facet of the wings 223c, which is designed to attach to the vehicle, may substantially be in the same plane as the printed side of the ECB 240 when it is placed in recess 224. Some embodiments may have one or more rows of bumps 227 around the recess 224. The top of the bumps 227 may substantially be in the same plane as the printed side of the ECB 240 when it is placed in recess 224. The wings 223c as well as the bumps 227 are used for improving the gluing of NRT 200 to the wall 124 of the FTIPC 120 (FIG. 1) or to the fuel-tank-intake pipe itself in other vehicles.

The ECB 240 may have a printed circuit board having two sides, a components side and a printed side. In FIG. 2 the printed side faces the reader. The electronic components of the ECB are placed in the other side of the board at the other side of the area that is marked as circle 246. The printed conductors that connect between the different components or conductors (legs, pins) of the same component are printed on the side that faces the reader, in the printed side of the board. Further, although some or all of the components of the ECB 240 locates in the other side of the area limited by circle 246, the printed conductors pass out and in the circle area 246, thus in case that the circle area is detached from the printed circuit, the conductors will break and the removed block will not operate. In some embodiments the circle 246 may comprise one or more slots for accelerating the breaking of the ECB 240 in the appropriate area. Further, in some embodiments the conductors (legs, pins) of one or more electronic components may be soldered in areas external to the circle 246. Thus, in an attempt to detach the NRT those components may be broken, rendering the ECB 240 non-functional.

The double sticky tape 230 may be adapted to engage the ECB 240 with the cell 220. The size of the sticky tape 230 may be similar to the size of the ECB 240. In addition, the sticky tape may have one or more holes 236 in similar locations as the relevant one or more holes 226 in recess 224 and the location of the electrical components of the ECB 240, the area that is marked by circle 246. The double sticky tape 230 may be used to stick the ECB 240 to the internal facet 223b of cell 220 at the recess 224 between pins 225. Further, the tape 230 may isolate the ECB 240 from the sealing material that will be used later on to seal, into a single block, the cell 200 together with the ferrite antenna 210 and the electronic components (not shown) that penetrate the space of compartment 222 via hole 226.

Figure 3:
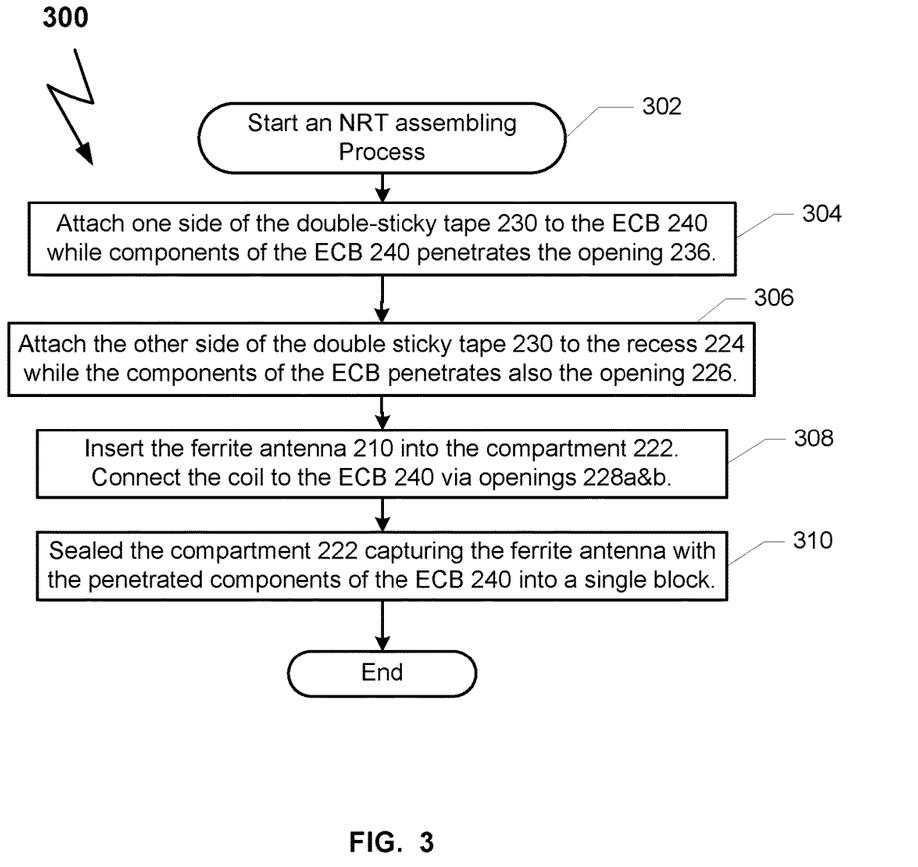
FIG. 3 is a flowchart illustrating relevant actions of an example method for assembling a NRT.

FIG. 3 illustrates a flowchart with relevant actions of an example method 300 for assembling an example embodiment of a NRT. At block 302 the components that are needed for assembling the NRT and the material for sealing the NRT may be gathered together. First, one side of the double-sticky tape 230 (FIG. 2) may be attached 304 to the component side of the ECB 240 such that the components of the ECB 240 penetrate the hole 236.

Next, the other side of the sticky tape 230 may be attached 306 to the recess 224, between pins 225 in such a way that the electronic components that penetrate the opening 236 also penetrate the opening 226 penetrating the space of compartment 222. At block 308 the ferrite antenna 210 may be inserted into the compartment 222. The two wires from both ends of coil 214 may be transferred via holes 228a&b and be connected to the ECB 240 to the appropriate conductors.

After connecting the two wires, a sealing material may be poured 310 to compartment 222 sealing the cell 220 together the ferrite antenna with the penetrated electronic components of ECB 240 and the holes 226 and 228a&b into a single block. During the sealing action the external facet, the printed side, of the ECB 240; the bumps 227 and the one or more wings 223c remain revealed, ready to be glued to a vehicle. At this point, an example embodiment of the NRT 200 is ready to be attached to a vehicle and process 300 may be terminated.

Figure 4:
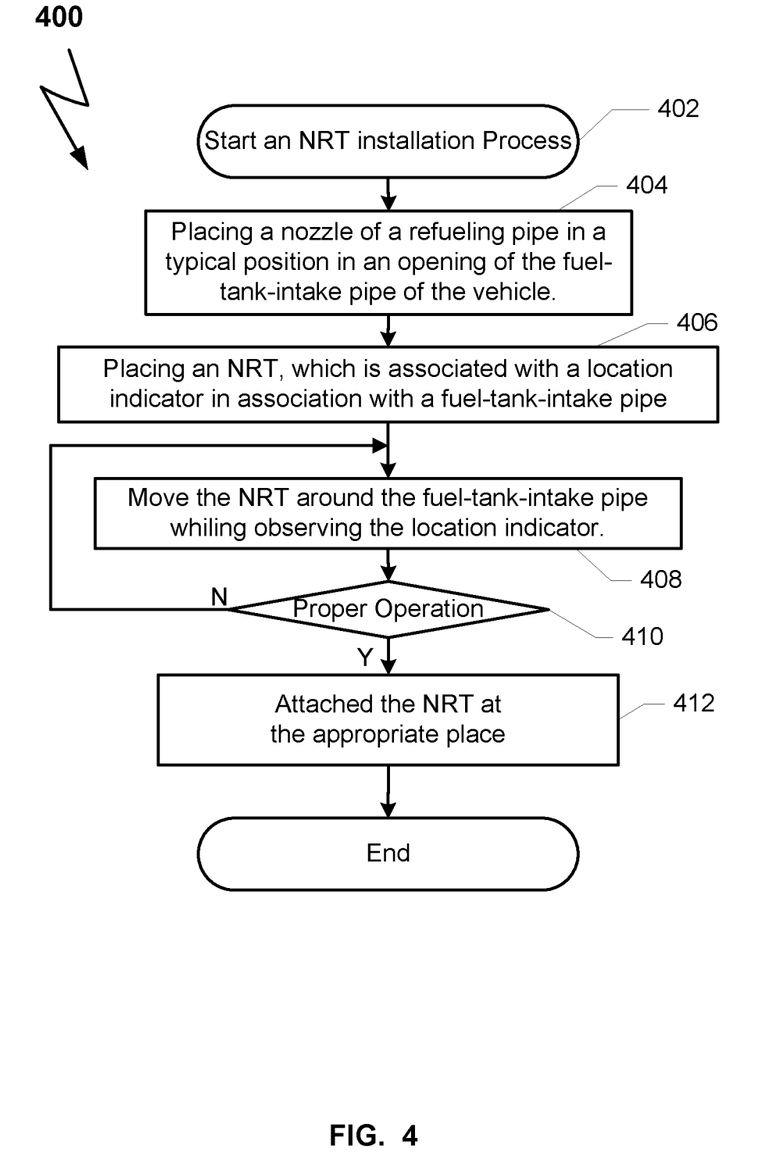
FIG. 4 is a flowchart illustrating relevant actions of an example method for attaching a NRT to a vehicle near the vehicle intake-pipe of a fuel tank.

FIG. 4 is a flowchart illustrating relevant actions of an example method 400 for attaching an example embodiment of a NRT 126 (FIG. 1) to a vehicle 110 near to the vehicle intake-pipe 122 of a fuel tank. Method 400 may be implemented 402 at a place that has an operating vehicle-refueling system, in a fuel station for example. Wherein the fuel station is a user of the vehicle-refueling system. Alternatively, method 400 may be implemented at a location that has a vehicle-refueling simulator. An example vehicle-refueling simulator may include a refueling pipe similar to the pipe 130 (FIG. 1) that comprises a handle 134, with an inductive ring 136 and a nozzle 132. Further, the vehicle-refueling simulator may be configured to transmit RF signal via the simulator conductive ring. The simulator's RF signal is transmitted in similar frequency band and similar energy as the real RF signal that is transmitted via a real inductive ring 136.

Alternate embodiment of the novel technique may use the vehicle-refueling system at the fuel station or the simulator at an installation station, in order to place the NRT at an appropriate location. The vehicle-refueling system or the simulator may be configured to indicate when the coupling between the NRT 126 and the inductive ring 136 at the nozzle 132 of the fuel pipe 130 (FIG. 1) is sufficient for proper operation.

At block 404 the nozzle of the refueling pipe is placed at a typical position in the opening 122 (FIG. 1) of the fuel-intake pipe of the vehicle 110. Detaching the nozzle of the fuel pipe from its location in a fuel dispenser or in the simulator, commences the RF transmitting via the inductive ring 136. Next in stage 406, the NRT 126, which is associated with a location indicator, is placed in association with the fuel-tank-intake pipe. The location indicator may be an internal location indicator such as a LED that is part of one of the facets of the NRT. In other example embodiment of a NRT, the location indicator may be an external one such as an external meter that is temporary connected to two pins at a facet of the NRT. In other embodiments in which a LED or pins may not be used, the vehicle-refueling system at the fuel station or the simulator at an installation station, may be configured to indicate when the coupling between the NRT 126 and the inductive ring 136 at the nozzle 132 of the fuel pipe 130 (FIG. 1) is sufficient for proper operation. The location indicator is configured to reflect the amount of RF energy that is received by the NRT ferrite antenna. In some vehicle the NRT 126 may be placed 406 in adjacent to the wall 124 of the FTIPC 120. In other vehicles, such as trucks for example, the NRT 126 may be placed in adjacent to the fuel-intake pipe itself.

At block 408, the NRT may be moved around the fuel-tank-intake pipe of the vehicle while observing the location indicator looking for a location in which the obtained RF energy is the highest or at least is sufficient for proper operation of the NRT. If 410 such a location was found, then the NRT is attached 412 to that location. Attaching the NRT may be done by gluing it to the wall 124 at that location or to the fuel-intake pipe itself. Gluing may be done by glue for example including but not limited to ST3294 manufactured by Holdtite Ltd. or QuikAluminum, QuikPlastik (depending on the material to which the NRT is attached) manufactured by Polymeric Systems, Inc (PSI), USA, the like or any combination thereof. If an external-location indicator is used, then the indictor may be removed before gluing the NRT. After attaching the NRT to the vehicle method 400 may terminate.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb.

The various embodiments have been described using detailed descriptions that are provided by way of example and are not intended to limit the scope of the invention. The described embodiments comprise different features, not all of which are required in all embodiments. Some embodiments utilize only some of the features or possible combinations of the features. Many other ramification and variations are possible within the teaching of the embodiments comprising different combinations of features noted in the described embodiments.

It will be appreciated by persons skilled in the art that the various embodiments are not limited by what has been particularly shown and described herein above. Rather the scope of the invention is defined by the claims that follow.

The invention claimed is:

1. A radio-frequency-identification (RFID) transponder (RFIDT) assembly (200) for an automated vehicle refueling system and configured to be securely associated with a vehicle around the fuel intake pipe with an adhesive that is inert to the environment near the fuel intake pipe the device having at least one tamperproof measure, the assembly including:
   a. a housing (220) to be associated with a vehicle surface with said adhesive, said housing (220) having an internal compartment (222) for housing a ferrite antenna assembly (210), said housing (220) having an external face (223a) and an internal face (223b) defining said internal compartment (222);
      i. said external face is (223a) is configured to face the opening of the fuel intake pipe;
      ii. said internal face (223b) is configured to be coupled to the vehicle surface with said adhesive and features at least one opening (226) that is continuous with said internal compartment (222); said opening (226) defining said at least one tamperproof measure; wherein said internal face (223b) is configured to receive said adhesive along the surface of the internal face and into said opening (226);
   b. a RFID-electronic circuit board (ECB) (240) configured to fit along the surface of said internal face (223b); said RFID ECB (240) features an ECB portion (246) that is configured to align with said opening (226) such that when assembled said ECB portion (246) fits within said opening (226); said RFID-electronic circuit board (ECB) (240) having:
      i. an ECB external face including an adhesive layer for coupling directly to a vehicle surface around the fuel intake pipe;
      ii. and an ECB internal face for coupling with said housing (220) along said internal face (223b) and said opening (226) by the application of said adhesive;
   the assembly characterized in that said opening (226) is configured to receive both said ECB portion (246) and said adhesive, therein forming a first tamperproof measure wherein said adhesive couples said ECB portion (246) within said opening (226); a second tamperproof measure wherein said RFID-electronic circuit board (ECB) (240) includes at least one or more breaking slots for accelerating the breaking of the said RFID-electronic circuit board (ECB) (240) during a removal attempt;
   and wherein an attempt to remove said radio-frequency-identification (RFID) transponder (RFIDT) (200) from said vehicle surface breaks at least a portion of said electronic circuit board (ECB) (246, 240) therein rendering said radio-frequency-identification (RFID) transponder (RFIDT) assembly (200) nonoperational.

2. The assembly of claim 1, wherein the ferrite-antenna assembly (210) comprises a coil (214) wounded around a ferrite brick (212) and adapted to operate at frequency of below 500 KHz.

3. The assembly of claim 2, wherein said frequency is about 120-150 KHz.

4. The assembly of claim 2, wherein at least one dimension of the ferrite brick is larger than 5 mm.

5. The assembly of claim 1 wherein said breaking slots are disposed about said ECB external surface or said ECB internal surface.

6. The assembly of claim 1 wherein said breaking slots are disposed about said ECB portion (246).

7. The assembly of claim 1 wherein said ECB portion (246) is configured to include conducting wire that are essential for the proper functioning of said RFID-electronic circuit board (ECB) (240), wherein said conducting wire are configured to be severed during a removal attempt, therein rendering said assembly nonoperational.

8. The assembly of claim 1 wherein said ECB portion (246) comprises at least one electronic component essential for the proper functioning of said RFID-electronic circuit board (ECB) (240), wherein said essential electronic component is configured to be severed from said RFID-electronic circuit board (ECB) (240) during a removal attempt therein rendering said assembly nonoperational.

9. The assembly of claim 1 wherein said RFID-electronic circuit board (ECB) (240) may further comprise at least one opening for receiving an anchoring pin.

10. The assembly of claim 9 wherein said internal face (223b) further comprises a second opening configured to receive at least a portion of said anchoring pin.

11. The assembly of claim 1 wherein said internal face (223b) further comprises two opening (228a,228b) for threading wiring between said RFID-electronic circuit board (ECB) (240) and said ferrite antenna assembly (210).

12. The assembly of claim 1 wherein said internal face (223b) further comprises a framing recess (224) for receiving the perimeter said RFID-electronic circuit board (ECB) (240).

13. The assembly of claim 12 wherein said housing (220) is configured to be further securely associated directly with the vehicle surface with said adhesive along the perimeter surrounding said framing recess (224).

14. The assembly of claim 12 wherein said framing recess (224) is configured for receiving the perimeter said RFID-electronic circuit board (ECB) (240).

15. The assembly of claim 12 wherein said framing recess (224) is surrounded by bumps (227) configured increase the surface area of said internal face (223b).

16. The assembly of claim 1 wherein said RFID ECB (240) is fit with a protective layer along said ECB internal face.

17. A method for assembling a radio-frequency-identification (RFID) transponder (RFIDT) assembly and coupling to a surface of the vehicle near a fuel-tank-intake-pipe chamber, the method comprising:
   a. identifying a location for placing the assembly, the assembly including:
      a housing having an internal compartment for housing a ferrite antenna assembly, said housing having an external face and an internal face defining said internal compartment;
      said external face is configured to face the opening of the fuel intake pipe;
      said internal face is configured to be coupled to the vehicle surface with said adhesive and features at least one opening that is continuous with said internal compartment; said opening defining said at least one tamperproof measure;

wherein said internal face is configured to receive said adhesive along the surface of the internal face and into said opening;

a RFID-electronic circuit board (ECB) configured to fit along the surface of said internal face; said RFID ECB features an ECB portion that is configured to align with said opening such that when assembled said ECB portion fits within said opening; said RFID-electronic circuit board (ECB) having:

an ECB external face including an adhesive layer for coupling directly to a vehicle surface around the fuel intake pipe; and an ECB internal face for coupling with said housing along said internal face and said opening by the application of said adhesive;

the assembly characterized in that said opening is configured to receive both said ECB portion and said adhesive, therein forming a first tamperproof measure, wherein said adhesive couples said ECB portion within said opening;

a second tamperproof measure wherein said RFID-electronic circuit board (ECB) includes at least one or more breaking slots for accelerating the breaking of the said RFID-electronic circuit board (ECB) during a removal attempt; wherein an attempt to remove said radio-frequency-identification (RFID) transponder (RFIDT) from said vehicle surface breaks at least a portion of said electronic circuit board (ECB) therein rendering said radio-frequency-identification (RFID) transponder (RFIDT) assembly nonoperational; and b. affixing said ECB external face to said vehicle surface;

c. applying an adhesive that is inert to the environment near the fuel-tank-intake-pipe onto said ECB internal face;

d. coupling said housing onto said vehicle surface by associating said housing over said ECB internal face therein allowing said adhesive to flow along said ECB internal face and into said opening characterized in that said ECB portion is fit within said opening to form said assembly.

18. The method of claim 17 wherein said adhesive is further applied along the perimeter of housing (220) along at least one of said internal face (223*b*) or said external face (223*a*).

19. The method of claim 17 further comprising introducing an anchoring pin through an opening disposed along said RFID-electronic circuit board (ECB) (240), onto said vehicle surface, said anchoring pin configured to be coupled to said internal face (223*b*) with said adhesive.

* * * * *